(12) United States Patent
Bultinck et al.

(10) Patent No.: US 8,942,185 B2
(45) Date of Patent: Jan. 27, 2015

(54) QUALITY OF SERVICE MANAGEMENT IN A MOBILE COMMUNICATION SYSTEM

(75) Inventors: Alain Bultinck, Nozay (FR); Laurent Thiebaut, Nozay (FR); Denis Fauconnier, Velizy (FR)

(73) Assignee: Alcatel Lucent, Boulogne Billancourt (FR)

( * ) Notice: Subject to any disclaimer, the term of this patent is extended or adjusted under 35 U.S.C. 154(b) by 907 days.

(21) Appl. No.: 12/457,648

(22) Filed: Jun. 17, 2009

(65) Prior Publication Data
US 2009/0323612 A1 Dec. 31, 2009

(30) Foreign Application Priority Data
Jun. 19, 2008 (EP) .................................. 08305282

(51) Int. Cl.
*H04W 4/00* (2009.01)
*H04W 40/00* (2009.01)
*H04M 1/00* (2006.01)
*H04W 28/24* (2009.01)
*H04W 72/10* (2009.01)

(52) U.S. Cl.
CPC .............. *H04W 28/24* (2013.01); *H04W 72/10* (2013.01)
USPC ........ 370/329; 370/338; 455/445; 455/550.1; 455/552.1

(58) Field of Classification Search
USPC ...................... 370/230, 329, 395.42
See application file for complete search history.

(56) References Cited

U.S. PATENT DOCUMENTS

| | | | |
|---|---|---|---|
| 6,668,175 B1 | 12/2003 | Almgren et al. | |
| 2006/0140115 A1* | 6/2006 | Timus et al. | 370/230 |
| 2007/0237134 A1* | 10/2007 | Bergenlid et al. | 370/352 |
| 2008/0020775 A1 | 1/2008 | Willars | |
| 2008/0031273 A1 | 2/2008 | Wang | |
| 2008/0132269 A1* | 6/2008 | Shen et al. | 455/550.1 |
| 2009/0325634 A1* | 12/2009 | Bienas et al. | 455/552.1 |
| 2010/0240385 A1* | 9/2010 | Lohr et al. | 455/452.2 |

FOREIGN PATENT DOCUMENTS

| | | |
|---|---|---|
| WO | WO 2006/065174 | 6/2006 |
| WO | WO 2008/031919 | 3/2008 |

OTHER PUBLICATIONS

Office Action for corresponding European Application No. 08 305 282.9 dated Jan. 27, 2014.

* cited by examiner

*Primary Examiner* — Brandon Renner
(74) *Attorney, Agent, or Firm* — Harness, Dickey & Pierce

(57) ABSTRACT

In one aspect, a method for Quality of Service management in a mobile communication system is provided, comprising, in an embodiment:
temporarily providing, to a Bearer that has just been established for Non Real Time services, a higher priority than requested at Bearer establishment.

12 Claims, 1 Drawing Sheet

FIG_1
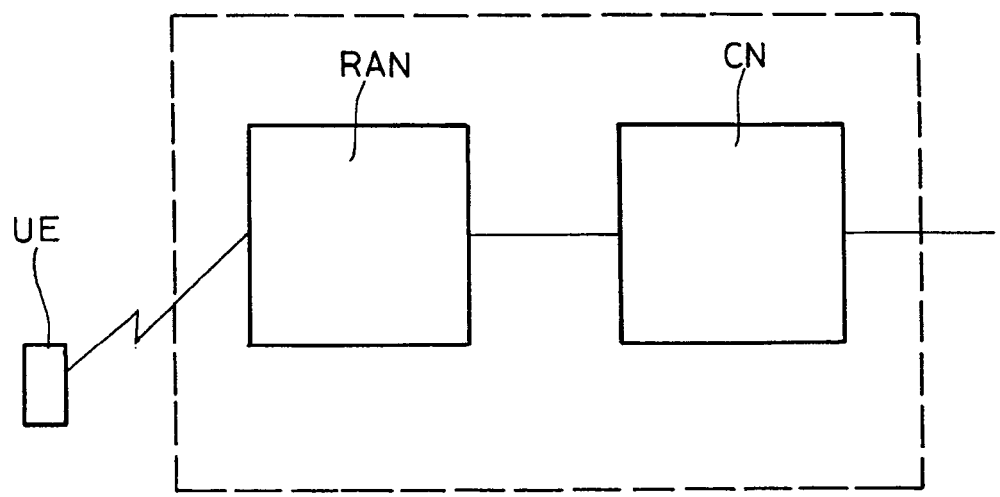
FIG_2
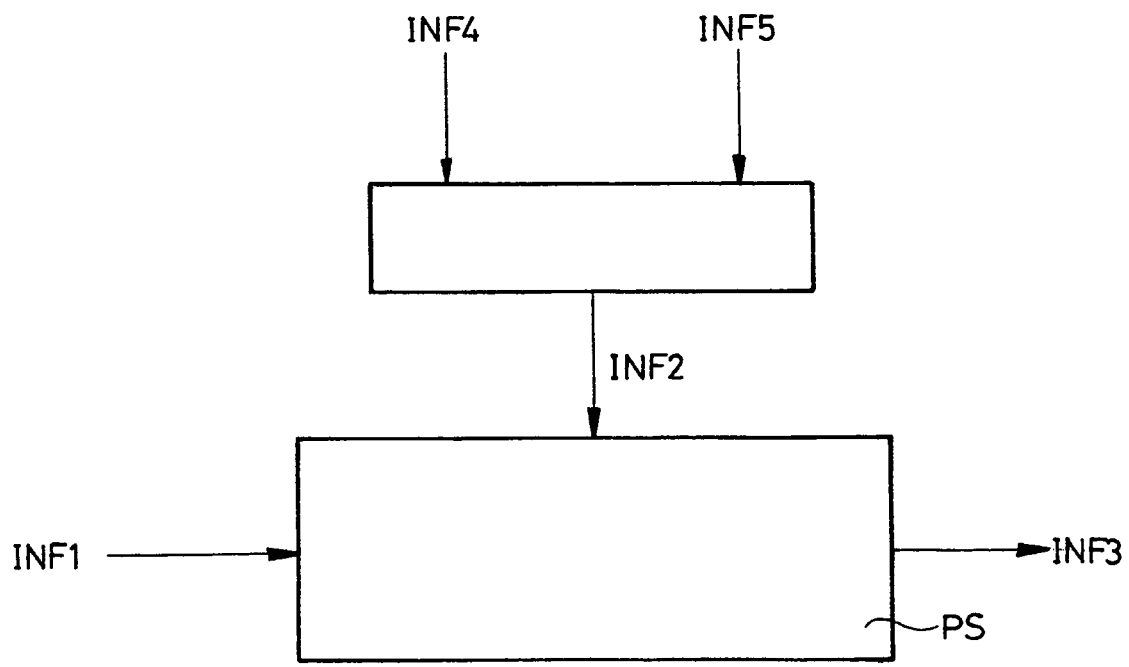

QUALITY OF SERVICE MANAGEMENT IN A MOBILE COMMUNICATION SYSTEM

CROSS-REFERENCE TO RELATED APPLICATIONS

This application is based on European Patent Application No. 08305282.9 filed Jun. 19, 2008, the disclosure of which is hereby incorporated by reference thereto in its entirety, and the priority of which is hereby claimed under 35 U.S.C. §119.

FIELD OF THE INVENTION

The present invention generally relates to communication networks and systems, in particular (but not limited to) mobile communication networks and systems.

BACKGROUND

Detailed descriptions of communication networks and systems can be found in the literature. For example, detailed descriptions of mobile communication networks and systems can be found in Technical Specifications published by standardisation bodies such as for example 3GPP (3$^{rd}$ Generation Partnership Project), . . . etc.

Examples of mobile communication systems include GSM/GPRS, UMTS, CDMA 2000, 3G LTE, WiMAX, . . . etc.

As recalled in FIG. 1, in such systems, a mobile station or User Equipment (UE) has access via a Radio Access Network (RAN) to services provided by a Core Network (CN). Examples of Radio Access Network (RAN) include GERAN (for GSM/GPRS), UTRAN (for UMTS), ERAN (for 3G LTE), . . . etc.

SUMMARY

QoS (Quality of Service) support in such systems is important, especially in the radio part where resources are scarce and thus QoS realization more complex to achieve.

There is a need to improve QoS support in such systems.

These and other objects are achieved, in one aspect, by a method for Quality of Service management in a communication system, comprising, in an embodiment:

temporarily providing, to a Bearer that has just been established for Non Real Time services, a higher priority than requested at Bearer establishment.

These and other objects are achieved, in another aspect, by a mobile communication network entity, configured to, in an embodiment:

temporarily provide, to a Bearer that has just been established for Non Real Time services, a higher priority than requested at Bearer establishment.

BRIEF DESCRIPTION OF THE DRAWINGS

These and other objects will become more apparent from the following description taken in conjunction with the accompanying drawings:

FIG. 1 is intended to recall the general architecture of a mobile communication system, FIG. 2 is intended to illustrate an example of packet scheduling using an embodiment of the present invention.

DESCRIPTION OF EMBODIMENTS

Embodiments of the present invention may be explained as follows, for example for the case of a Radio Bearer RB (it being understood that such example is not limitative and any type of bearer could be envisaged).

It is recalled that end-to-end QoS architecture in such systems generally relies on Bearers and associated QoS parameters, such as in particular Radio Bearer RB in the radio part.

Different QoS levels are generally provided. For example, the QoS level of a RB is specified by the CN to the RAN in relevant QoS parameters provided at RB establishment.

For example, currently, priority as requested at RB establishment is used in QoS management mechanisms such as for example packet scheduling enabling to divide available NRT (Non Real Time) capacity between simultaneous NRT users. An example of QoS parameter related to priority is the THP (Traffic Handling Priority) for 3G radio or GSM/GERAN radio.

Currently, such a QoS level requested by the CN at RB establishment is fixed during the life-time of the RB and no mechanism allows to improve the end-user experience, in particular for very bursty traffic (especially when the terminal wakes up from Idle to Connected state).

As recognized by the applicant of the present application, there is a need to improve such QoS management mechanisms. For example, as recognized by the applicant of the present application, currently no mechanism allows to:

serve better the RB if it corresponds to very short packet exchanges, improve the end-user experience when the mobile station goes from Idle state to Connected state.

. . . etc.

In one embodiment, it is provided that during some time (which may be configurable), when the RAN has just established a RB in a cell, a higher priority than the one requested by the CN is provided by the RAN to the RB (being established).

An RB may have just been established in a cell because:

The RAN has just received (from the CN) a request to establish a new RB (for example because the UE has just waken up from IDLE to CONNECTED state), The RAN (acting as a target cell) has just received a new UE as part of a Hand-Over procedure.

The aim can be, for example, to serve better very short transactions, such as a RB that has just been established to carry for example:

IMS SIP signalling, for example when the UE is calling someone or is being called, HTTP get (web browsing) request, Ping traffic, . . . etc.

The idea is that the user will very soon see the system reacting to his/her request for service (e.g. when the user clicks on a bookmark, he/she will more rapidly see the first answer from the system)

In another example, the aim can be, not only to grant temporary better QoS level (than requested) at mobile access Network bearer establishment (e.g. at SAE bearer/PDP context activation), but mainly to grant such better QoS level when the UE has issued signalling to move from Idle to Connected state.

Granting a higher priority to a RB that has just been (re)-established over the RAN helps making sure that the first IP flows exchanged on this bearer will be served with a better QoS level and allows compensating for the time spent to establish the RB.

For example, in case of UE requested bearer establishment (e.g. because the user has connected a laptop to his/her mobile phone), the proposed mechanism allows the end-user to be quicker prompted for authentication to access his/her corporate network (as better IP connectivity is temporarily provided to the laptop). To improve the end-user experience in this example, it is more important to gain ½ s for the user to be able to log onto his/her corporate (i.e. to improve the first IP exchanges) than to gain ½ s for a file transfer during an e-mail resynchronisation).

When the UE issues relevant signalling (e.g. a Service Request) to go from Idle to Connected state, granting a higher priority to the RB that has just been (re)-established helps making sure that the first messages (at service level such as SIP, HTTP, RTSP, . . . ) sent by the UE will be served with some priority and allows compensating for the time spent to re-establish the radio resources for the UE, including the RB.

In one embodiment, giving a higher priority to a Radio Bearer (RB) (that has just been established in the cell) is implemented by providing that, for Non Real Time traffic, during some amount of time the scheduling algorithm in the RAN (both for DL and UL traffic), provides a higher relative priority (the equivalent of a higher DSCP if the RAN was an IP Router). This would correspond to a RB with a better THP (Traffic Handling Priority) over 2G/3G or with a better QoS Label (over E-UTRAN/LTE).

Advantageously, the duration during which this higher QoS level is granted at RB establishment should be short (for example a default value could be around 1 s).

In one embodiment, the operator may configure one or more parameters such as:
the duration during which this higher priority is granted at RB establishment,
the amount (proportion) of higher relative priority granted to Non Real Time RB at RB establishment.

Such mechanism may be implemented by providing, for example, that the scheduling algorithm in the RAN gives a higher priority to a Radio Bearer (RB) that has just been established in the cell. This may be provided both for downlink and uplink.

An example of packet scheduler in the RAN using such mechanism is illustrated in FIG. 2.

The packet scheduler (noted PS) generally divides available NRT capacity between simultaneous NRT users. Priority is used by the packet scheduler to decide how to allocate the capacity to the different users.

The packet scheduler therefore receives input information such as, in particular, information (noted $INF_1$) related to estimated available Non Real Time capacity, and information (noted $INF_2$) related to users' requests and associated priority. The packet scheduler provides output information such as information (noted $INF_3$) related to RB bit rates allocated as a function of input information.

In the illustrated example, input information $INF_2$ is obtained by taking into account, not only information (noted $INF_4$) related to priority as requested at RB establishment, but also information (noted $INF_5$) indicating that a priority higher than the one requested at RB establishment should be provided, to an RB that has just been established (or re-established). Information $INF_5$ can be obtained by taking into account information such as for example:
indication that an RB has just been established (or re-established),
duration during which this higher priority should be granted at RB establishment,
amount (proportion) of higher relative priority granted to Non Real Time RB at RB establishment,
. . . etc.

A packet scheduler over radio can be implemented in any RAN Node such as for example: ENB (Enhanced Node B) for LTE, RNC (Radio Network Controller) or Node B for 3G, GERAN/PCU (Packet Control Unit) for GSM, BS (Base Station) for Wimax, . . . .

It should be noted that even though a Wimax ASN-GW (Access Service Network Gateway) is not considered by WMF (Wimax Forum) as a Core Network Node, the ASN-GW can nevertheless be considered as belonging to the Core Network as it is a Node that requires establishment/modification of Radio Bearers (RB) from the Radio.

In an embodiment, the present invention can also be used to improve and refine end to end efficiency, in nodes upper in the network that, in the user plane, are concerned with idle mode termination and mobility anchor point. This includes Core Network nodes such as for example the 2G/3G SGSN, the EPC (3GPP Evolved Packet Core) S_GW (Serving Gateway), . . . etc.

Generally, embodiments of the present invention can be implemented in any network entity.

In an embodiment, there is provided a network entity configured to, in an embodiment:
temporarily provide, to a Bearer that has just been established for Non Real Time services, a higher priority than requested at Bearer establishment.

The detailed implementation of such configuration does not raise any special problem for a person skilled in the art, and therefore does not need to be more fully disclosed than has been made above, for a person skilled in the art.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for Quality of Service (QoS) management in a mobile communication system, comprising:
receiving a bearer request for a user equipment, the bearer request including a first QoS level associated with the bearer request;
assigning, to a bearer established upon receiving the bearer request, a second QoS level for a period of time, the second QoS level being higher than the first QoS level; and
assigning, to the Bearer, the first QoS level upon expiration of the period of time.

2. The method according to claim 1, further comprising:
providing said second QoS level to compensate for a time to establish said Bearer.

3. The method according to claim 2, wherein said time includes time to move from an idle state to a connected state.

4. The method according to claim 1, further comprising:
setting a duration during which said second QoS level is provided.

5. The method according to claim 1, further comprising:
setting the second QoS level provided.

6. The method according to claim 1, wherein the assigning, to the Bearer, the first QoS level, assign the first QoS level in a same session context.

7. A mobile communication network entity comprising:
a processor configured to,
- receive a bearer request for a user equipment, the bearer request including a first QoS level associated with the bearer request,
- assign, to a bearer established upon receiving the bearer request, a second QoS level for a period of time, the second QoS level being higher than the first QoS level, and
- assign, to the Bearer, first QoS level upon expiration of the period of time.

8. The network entity according to claim 7, wherein the processor is further configured to provide said second QoS level to compensate for a time to establish said Bearer.

9. The network entity according to claim 8, wherein said time includes time to move from an idle state to a connected state.

10. The network entity according to claim 7, wherein the processor is further configured to set a duration during which said second QoS level is provided.

11. The network entity according to claim 7, wherein the processor is further configured to set the second QoS level provided.

12. The network entity according to claim 7, wherein the processor is configured to assign, to the Bearer, the first QoS level, in a same session context.

* * * * *